US006647532B1

(12) United States Patent
Boede et al.

(10) Patent No.: US 6,647,532 B1
(45) Date of Patent: Nov. 11, 2003

(54) BUILT-IN AUTOMATIC CUSTOMER IDENTIFIER WHEN CONNECTING TO A VENDOR WEBSITE

(75) Inventors: Jon Boede, Round Rock, TX (US); Robert Tuttle, Austin, TX (US)

(73) Assignee: Dell USA L.P., Round Rock, TX (US)

( * ) Notice: Subject to any disclaimer, the term of this patent is extended or adjusted under 35 U.S.C. 154(b) by 0 days.

(21) Appl. No.: 09/182,403

(22) Filed: Oct. 29, 1998

(51) Int. Cl.[7] .......................... G06F 15/00; G06F 17/00; G06F 17/24
(52) U.S. Cl. .......................... 715/513; 709/223; 710/36; 717/11
(58) Field of Search .......................... 707/513; 703/22; 710/36; 717/11, 4; 709/221, 223; 705/26; 379/93.01; 370/338

(56) References Cited

U.S. PATENT DOCUMENTS

| | | | |
|---|---|---|---|
| 5,572,643 A | | 11/1996 | Judson ........................ 709/218 |
| 5,604,803 A | | 2/1997 | Aziz ........................... 713/155 |
| 5,727,156 A | | 3/1998 | Herr-Hoyman et al. ...... 709/219 |
| 5,732,275 A | * | 3/1998 | Kullick et al. ................. 717/11 |
| 5,774,670 A | | 6/1998 | Montulli ...................... 709/227 |
| 5,804,803 A | | 9/1998 | Cragun et al. .............. 235/375 |
| 5,805,891 A | * | 9/1998 | Bizuneh et al. ................. 717/4 |
| 5,806,043 A | | 9/1998 | Toader ......................... 405/14 |
| 5,809,251 A | * | 9/1998 | May et al. ................... 709/223 |
| 5,809,287 A | * | 9/1998 | Stupek et al. ................... 73/22 |
| 5,845,077 A | * | 12/1998 | Fawcett ....................... 709/221 |
| 5,905,779 A | * | 5/1999 | Steinmetz ................. 379/93.01 |
| 5,999,740 A | * | 12/1999 | Rowley ....................... 717/11 |
| 6,031,830 A | * | 2/2000 | Cowan ........................ 370/338 |
| 6,074,434 A | * | 6/2000 | Cole et al. ..................... 717/11 |
| 6,151,643 A | * | 11/2000 | Cheng et al. ................. 710/36 |
| 6,167,383 A | * | 12/2000 | Hensen ........................ 705/26 |
| 6,205,579 B1 | * | 3/2001 | Southgate ..................... 717/11 |

FOREIGN PATENT DOCUMENTS

EP 0703 531 A 3/1996

OTHER PUBLICATIONS

Gateway Unveils Next Level of Education and Support for PCs Via HelpSpot Client Assistance Software, Business Wire, New York, Jul. 8, 1998,. pp. 1–3.*

Armstrong, Douglas D., Check Oil Change for software updates, Milwalkee Journal Sentinel, Jun. 22, 1998 pp. 1–2.*

Goeller, Karen E., Zen and the art of learning support: combining documentation, training, and online help functions for a unique organizational approach to information development, ACM Conference on Systems Documentation, Oct. 2–5, 1994, pp. 119–125.*

* cited by examiner

*Primary Examiner*—Joseph H. Field
*Assistant Examiner*—William L. Bashore
(74) *Attorney, Agent, or Firm*—Haynes and Boone, LLP

(57) ABSTRACT

Browser software loaded on a customer's system during a factory pre-install process that includes an identifying information for a computer system in a universal resource locator pre-installed on the system hard drive is described. HTML content pre-installed on the hard drive by a vendor includes identifying information so that when the customer contacts the vendor via the worldwide web, the customer and system are automatically identified to the vendor.

29 Claims, 5 Drawing Sheets

Fig. 5

SYSTEM SUPPORT PAGE

XPS D___

System Service Tag: BGP1X — 502
Express Service Code: 19254741
Shipped from Dell: 9/17/97 — 504

Technical Information
▷ Specifications
▷ Jumpers
▷ Controls and Indicators
▷ Tech Notes
▷ Graphics
▷ Documentation Drivers, Files, Utilities
▷ All Files for this System
▷ Dell File Library Main Page Self-Diagnostic Tools
▷ Audio
▷ AWE64 Audio Card
▷ Modem
▷ NIC (Network Interface Card)
▷ No POST/No Video
▷ Speakers
▷ Speakers ACS 295
▷ Speakers ACS 495
▷ Unacceptable Video ▷ Component and Software Support
▷ Frequently Asked Questions

| HOMEPAGE | WORLDWIDE SITES | PRODUCTS | PRICES | SUPPORT | SITE MAP | SEARCH | CONTACT |

BUILT-IN AUTOMATIC CUSTOMER IDENTIFIER WHEN CONNECTING TO A VENDOR WEBSITE

This application relates to U.S. patent application Ser. No. 09/012,196, filed on Jan. 23, 1998, now abandoned, entitled System And Method For Preparing A Computer Memory, naming Alan E. Beelitz as inventor. The co-pending application is incorporated herein by reference in its entirety, and is assigned to the assignee of this invention.

This application relates to U.S. patent application Ser. No. 09/012,962 filed on Jan. 26, 1998, now U.S. Pat. No. 6,182,275, entitled Generation of a Compatible Order For a Computer System, naming Alan E. Beelitz and Paul J. Maia as Inventors. The co-pending application is incorporated herein by reference In its entirety, and is assigned to the assignee of this invention.

This application relates to U.S. patent application Ser. No. 09/009,401, filed on Jan. 19, 1998, now U.S. Pat. No. 6,038,597, entitled Method And Apparatus For Providing And Accessing Data At An Internet Site naming Amy Van Wyngarden as inventor. The co-pending application is incorporated herein by reference in its entirety, and is assigned to the assignee of this invention.

This application relates to U.S. patent application Ser. No. 09/066,128, filed on Apr. 24, 1998, entitled Method And System For Supplying A Custom Software Image To A Computer System naming Tom Colligan, Jonathan Ellis and Hunter Robertson as inventors. The co-pending application is incorporated herein by reference in its entirety, and is assigned to the assignee of this invention.

BACKGROUND

The disclosures herein relate generally to computer systems and more particularly to factory installed HTML to automatically identify a build-to-order customer when connecting to a web site.

When an off-the-shelf computer system is purchased, the customer may eventually need to have the system serviced, or may wish to modify and/or enhance the system. In that event, the customer must be sure that system compatible service and/or enhancements are provided. This can be accomplished by identifying the customer's system by model number.

More recently, customers have been purchasing custom created systems as opposed to an off-the-shelf system. This can complicate service and modification of the system. Customers would have to know specifically what the make-up of their custom-built system is, as would the service technician or the vendor of the original system. This can be checked by providing the vendor or service technician with identifying information for the computer, such as a serial or other identification number or the name of the company that purchased the computer, so that the original purchase order or specifications can be referenced to know and understand all the custom features of a particular system.

For example, a customer may call the vendor and request a new or additional part or a replacement part for a custom built system. The vendor will need to reference the original system in order to advise the customer and provide compatible equipment. This is accomplished by the vendor requesting that the customer provide the serial number or other identification number so that the original system may be reviewed and compatible components can be provided. This requires that the customer know or be able to locate the serial number and that the vendor be able to locate sales records and specification data relating to the customer specific system.

After a customer purchases a computer system, he or she may also be able to access the vendor again on the worldwide web to inquire about service and or further modifications and enhancements available for the customer specific system. This scenario still requires some form of, or exercise in, identifying the original system to avoid substituting or adding parts or enhancements that are not compatible with the original system. An example of a web page 100 for providing such identifying information to the vendor via the worldwide web is shown FIG. 1. As shown in FIG. 1, using the web page 100 a customer enters either a system service tag or express service code in a field 102 and then selects a button 104 labeled "Submit" to submit the information to the vendor.

Therefore, what is needed is a means for automatically identifying build-to-order customers when they connect back to a vendor via the worldwide web. No known system combines the task of connecting to the vendor and automatically providing identifying information.

SUMMARY

One embodiment, accordingly, provides browser software loaded on a customer's system during a factory pre-install process that includes the customer's identification number in a universal resource locator pre-installed on the system hard drive. To this end, a computer system includes browser software provided on a hard drive in a customer system. The HTML content that is pre-installed on the hard drive by a vendor includes identifying information so that when the customer contacts the vendor via the worldwide web, the customer and system are automatically identified to the vendor.

A principal advantage of this embodiment is that when the customer contacts the vendor, the customer does not have to locate the system's serial number or other necessary identifying information and possibly enter the information incorrectly on a form on a web page. The automatic identification of the customer and system to the vendor enables the vendor to provide the customer with information regarding the customer's specific system or the business segment that the customer services.

BRIEF DESCRIPTION OF THE DRAWINGS

FIGS. 4–7 illustrate various exemplary web pages of a vendor website embodying features of a preferred embodiment.

DESCRIPTION OF A PREFERRED EMBODIMENT

Figure 1:
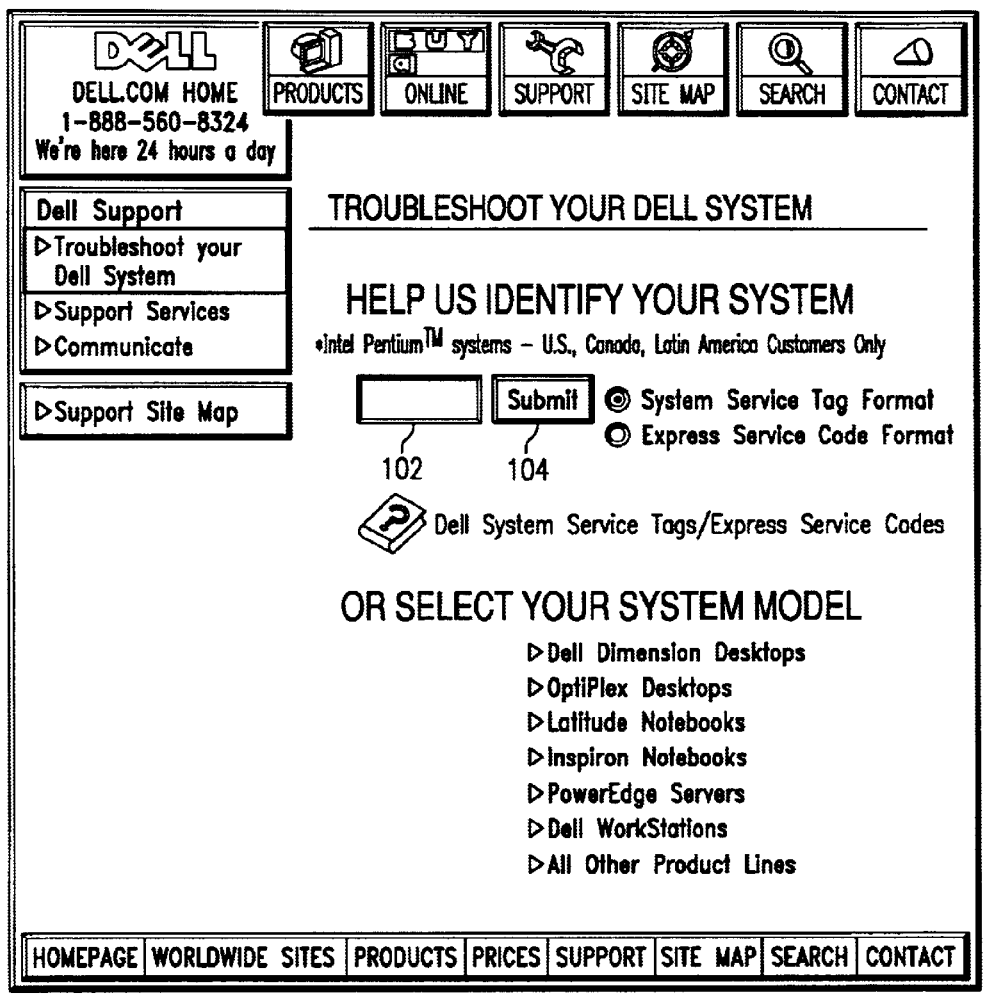
FIG. 1 illustrates a web page of a vendor website for obtaining identifying information for a computer system.

FIG. 1 illustrates a web page of a vendor website for obtaining identifying information for a computer system, as described above.

Figure 2:
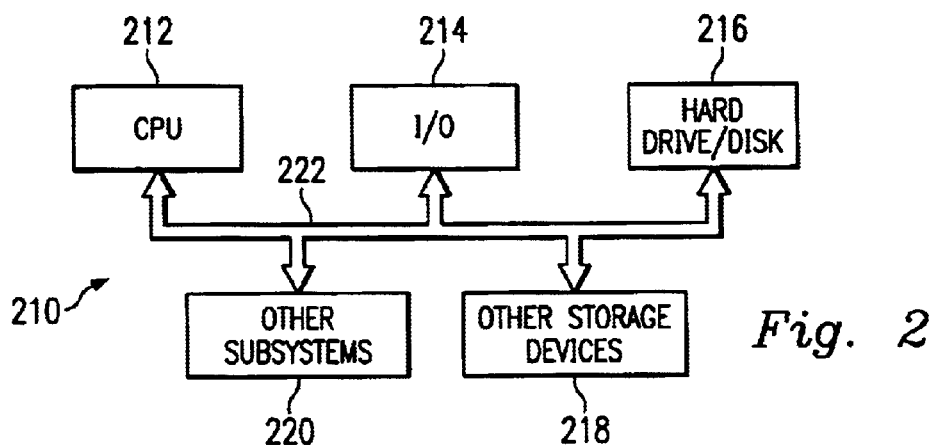
FIG. 2 is a block diagram of an exemplary personal computer system.

FIG. 2 is a system block diagram of a computer system 210 embodying features of a preferred embodiment. The computer system 210 includes a central processing unit ("CPU") 212, I/O devices, such as a display, a keyboard, a mouse, and associated controllers, collectively designated by a reference numeral 214, a hard disk and drive 216 and other storage devices, such as a floppy disk and drive and memory devices, collectively designated by a reference numeral 218, and various other subsystems, collectively designated by a reference numeral 220, all interconnected via one or more buses, shown collectively in FIG. 2 as a bus 222.

Figure 3:
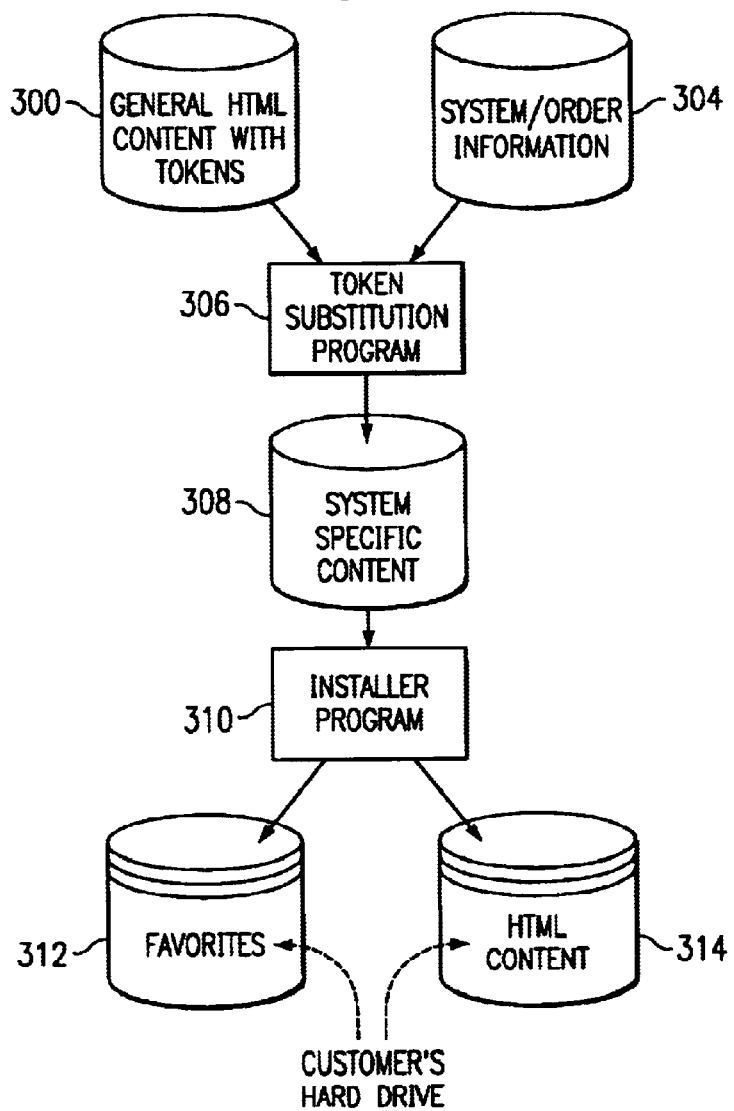
FIG. 3 is a block diagram of an exemplary operation of a preferred embodiment.

FIG. 3 illustrates a factory installation process embodying features of a preferred embodiment. During installation of factory-installed software during manufacture of a computer system, such as the computer system 210, it is known to install general HTML content with tokens ("general HTML content") 300 onto the system 210. In accordance with a preferred embodiment, the general HTML content 300 is provided to a token substitution program 302 along with system and order information 304 specific to the particular computer system being configured. The information 304 typically includes system-specific information, i.e., an indication of hardware and software installed on the system, as well as system- and customer-specific information. The token substitution program 306 combines the general HTML content 300 with the system/order information 304 to generate system-specific content 308.

In particular, the token substitution program 306 inserts certain identifying information, which in the illustrated embodiment includes a system service tag ("SNUM") and a company type identifier ("COMPANY") into a uniform resource locator ("URL") referred to as a "GET URL" provided within the general HTML content of the system 210. Specifically, assuming the system service tag is BGP1X and the company type identifier is 26, the token substitution program 306 takes:

http://mydell.us.dell.com/channel/start.asp?svctag=
    %SNUM%&company=%COMPANY% and generates the system specific content 308:

http://mydell.us.dell.com/channel/start.asp?svctag=
    BGP1X&company=26

An installer program 310 installs the system specific content 308 as part of the "Favorites" and "HTML Content" databases 312, 314, respectively, preinstalled on the hard drive 216 of the customer's system 210.

It will be recognized that the above-described installation procedures shown and described with reference to FIG. 3 will be performed whether the computer system 210 is an "off-the-shelf" or "build-to-order" system.

Operation of the preferred embodiment described above will now be illustrated and described with reference to FIGS. 4–7.

Figure 4:
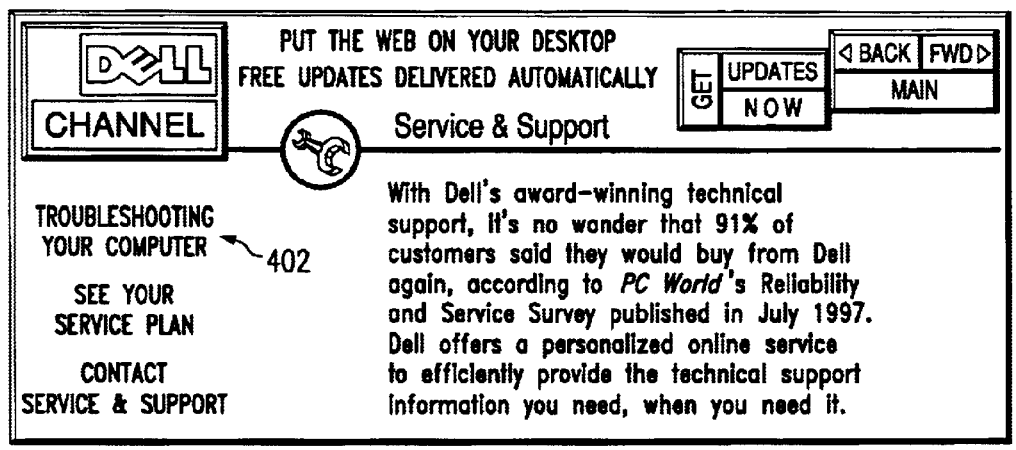

Referring to FIG. 4, a web page 400 is displayed when a customer has taken the appropriate step(s), such as making a selection from a list of "Favorites", or "Bookmarks", used interchangeably, to access vendor service and support via the worldwide web. Selecting the phrase "TROUBLESHOOTING YOUR COMPUTER" 402 results in the display of a web page 500 illustrated in FIG. 5. Using the system specific content 308 stored on the hard drive 216, the system service tag field 502 and express service code field 504 are automatically respectively filled in with the system service tag (in this case BGP1X) of the system 210, as well as an express service code corresponding to the system service tag (in this case, 19254741). It should be noted that the preferred embodiment described herein enables presentation of the web page 100 (FIG. 1) to be bypassed, as the information normally entered by the customer using the web page 100 is automatically entered by the preferred embodiment herein described.

Figure 6:
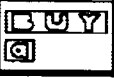

FIG. 6 illustrates a web page 600 used by a customer to subscribe to updates provided by the vendor in connection with the customer's particular system and/or user environment. Again, when this page 600 is accessed, the service tag of the customer's system is automatically entered in a field 602, which field is filled in automatically using the system specific content 308. An appropriate one of several "user environment" radio buttons 608a–608k is automatically filled in using the "company" designation of the system specific content 308. In the example illustrated in FIG. 6, the field 604 contains "BGP1X" and a radio button designated "K-12 Education" 608k, which corresponds to company type identifier 26, is automatically selected. The example shown in FIG. 6 illustrates again how the opportunity for a customer to make an error in entering identifying information, in this case, service tag and user environment, is eliminated by the automatic provision of this information to the vendor's website.

Figure 7:
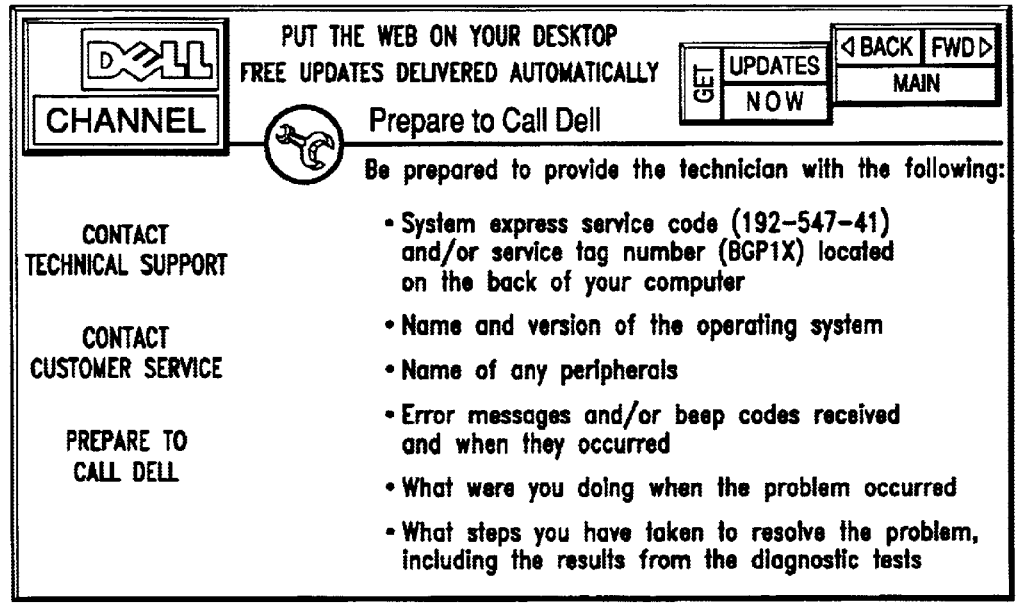

FIG. 7 illustrates yet another use of the preferred embodiment described herein for automatically providing identifying information for a computer; in this case, the information is provided for the benefit of a customer who has decided to contact the vendor via telephone, rather than the worldwide web. As shown in FIG. 7, a web page 700 provides information to a customer on contacting the vendor via telephone. In a first of a series of instructions, the customer is advised to be prepared to provide the vendor with the system service express code and/or service tag number, both of which are provided on the page 700 so that the customer does not need to locate that information on his or her system.

As a result, one embodiment provides a method of providing a computer system with a built-in automatic custom identifier for use in identifying the computer system to a vendor website. General HTML content with tokens for the computer system is provided to a token substitution program. System and order information specific to the computer system is provided to the token substitution program. The token substitution program combines the general HTML content with the system and order information to generate system-specific content. The system-specific content is installed on a hard drive of the computer system.

Another embodiment provides a computer system including a processor, a memory, and at least one storage. The computer system further includes system-specific content stored in the storage. The system-specific content includes a built-in automatic customer identifier for identifying the computer system to a vendor website when the computer system is connected thereto.

As it can be seen, the principal advantages of these embodiments are that when the customer contacts the vendor, the customer does not have to locate the system's serial number or other necessary identifying information and possibly enter the information incorrectly on a form on a web page. The automatic identification of the customer and system to the vendor enables the vendor to provide the customer with information regarding the customer's specific system or the business segment that the customer services. The customer is not required to remember or locate the identifying information for his or her system, as that identifying information is automatically provided to the vendor without customer involvement. Because the customer is not required to type in the necessary identifying information, the risk that errors will be introduced into the information due to typographical errors is effectively eliminated. Also, the customer is not required to read and understand a written explanation of how to find and enter the necessary identifying information, thereby accelerating the process of providing such information to the vendor.

It will be recognized that the automatic provision of the identifying information accomplished by the embodiment described herein enables the vendor website automatically to display on a web page thereof information specific to the computer system 210, including, but not limited to, a list of hardware and software components available for repairing or upgrading the computer system and troubleshooting instructions for enabling the customer to determine, and potentially fix, a problem with the computer system.

Although an illustrative embodiment has been shown and described, other modifications, changes, and substitutions are intended in the foregoing disclosure. Accordingly, it is appropriate that the appended claims be construed broadly and in a manner consistent with the scope of the disclosure.

What is claimed is:

1. A method of providing a custom configured computer system having a built-in automatic customer and system identifier configured to identify the computer system to a vendor website, the method comprising:
   providing general HTML content with tokens for the computer system to a token substitution program;
   providing system and order information specific to the computer system to the token substitution program, wherein the token substitution program combines the general HTML content with the system and order information to generate system-specific content;
   installing the system-specific content on a hard drive of the computer system during a computer system pre-install process; and
   using the system-specific content stored on the hard drive so that a system service tag field and an express service code field are automatically filled in with a system service tag to automatically identify the computer system in response to a customer accessing the vendor website.

2. The method of claim 1, wherein the system-specific content comprises a GET URL.

3. The method of claim 1, wherein the system and order information comprises a system identifier for the computer system.

4. The method of claim 2, wherein the system identifier includes a customer type, further wherein responsive to a connection of the computer system to the vendor website, the customer type automatically enables vendor website selection of a customer environment to be made and displayed on a web page of the vendor website.

5. The method of claim 1, wherein installing includes storing the system-specific content in a bookmarks database of the hard drive.

6. The method of claim 1, wherein installing includes storing the system-specific content in a HTML content database of the hard drive.

7. The method of claim 1, wherein responsive to a connection of the computer system to the vendor website, the system-specific content is automatically provided to the vendor website and enables the vendor website to display on a web page of the vendor website, information specific to the computer system as a function of the system-specific content.

8. The method of claim 7, wherein the information specific to the computer system comprises a list of available hardware components.

9. The method of claim 7, wherein the information specific to the computer system comprises troubleshooting instructions.

10. The method of claim 7, wherein the information specific to the computer system comprises a list of available software components.

11. A system for providing a custom configured computer having a built-in automatic customer and system identifier configured to identify the computer to a vendor website, said system comprising:
    means for providing general HTML content with tokens for the computer to a token substitution program;
    means for providing system and order information specific to the computer to the token substitution program, wherein the token substitution program combines the general HTML content with the system and order information to generate computer-specific content; and
    means for installing the computer-specific content on a hard drive of the computer during a computer pre-install process, so that a system service tag field and express service code field are automatically filled in with a system service tag to automatically identify the computer system in response to a customer accessing the vendor website.

12. The system of claim 11, wherein the computer-specific content comprises a GET URL.

13. The system of claim 11, wherein the system and order information comprises a system identifier for the computer.

14. The system of claim 13, wherein the system identifier includes a customer type, further wherein responsive to a connection of computer to the vendor website, the customer type automatically enables vendor website selection of a customer environment to be made and displayed on a web page of the vendor website.

15. The system of claim 11, wherein the computer-specific content is stored in a favorites database of the hard drive.

16. The system of claim 11, wherein the computer-specific content is stored in a HTML content database of the hard drive.

17. The system of claim 11, wherein responsive to a connection of the computer to the vendor website, the computer-specific content is automatically provided to the vendor website and enables the vendor website to display on a web page of the vendor website, information specific to the computer as a function of the computer-specific content.

18. The system of claim 17, wherein the information specific to the computer comprises a list of available hardware components.

19. The system of claim 17, wherein the information specific to the computer comprises troubleshooting instructions.

20. The system of claim 17, wherein the information specific to the computer comprises a list of available software components.

21. A computer system comprising: a processor; a memory device; at least one storage device; and system-specific content stored in said at least one storage device, wherein said system-specific content comprises a built-in automatic customer and system identifier configured to identify said computer system to a vendor website in response to a selection of said system-specific content during an operation of said computer system, wherein said system-specific content having been generated during a computer system pre-install process by a token substituting program in response to (a) general HTML content with tokens for said computer system and (b) system and order information specific to said computer system, the token substitution program having combined the HTML content with the system and order information to generate said system-specific content, so that a system service tag field and an express service code field are automatically filled in with a system service tag to automatically identify the computer system in response to a customer accessing the vendor website.

22. The computer system of claim 21, wherein said system-specific content comprises a GET URL.

23. The computer system of claim 21, wherein said system and order information comprises a system identifier for said computer system.

24. The computer system of claim 23, wherein the system identifier includes a customer type, further wherein responsive to a connection of said computer system to the vendor website, the customer type identifier enables vendor website selection of a customer environment to be made and displayed on a web page of the vendor website.

25. The computer system of claim 21, wherein said system-specific content is stored in a favorites database of said at least one storage device.

26. The computer system of claim 21, wherein said system-specific content is stored in a HTML content database of said at least one storage device.

27. The computer system of claim 21, wherein responsive to a connection of said computer system to the vendor website, said system-specific content is automatically provided to the vendor website and enables the vendor website to display on a web page of the vendor website, information specific to the computer system as a function of said system-specific content.

28. The computer system of claim 27, wherein the information specific to said computer system is selected from the group consisting of a list of available hardware components, troubleshooting instructions, and a list of available software components.

29. The computer system of claim 21, wherein said at least one storage device is a hard drive.

* * * * *